J. R. BARRY.
Top.
No. 226,958. Patented April 27, 1880.
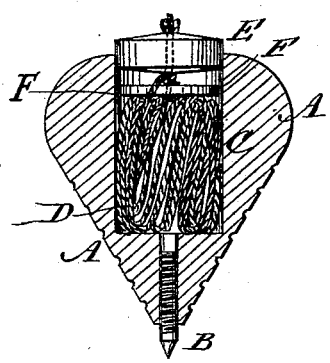
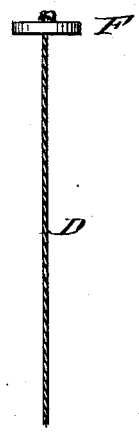
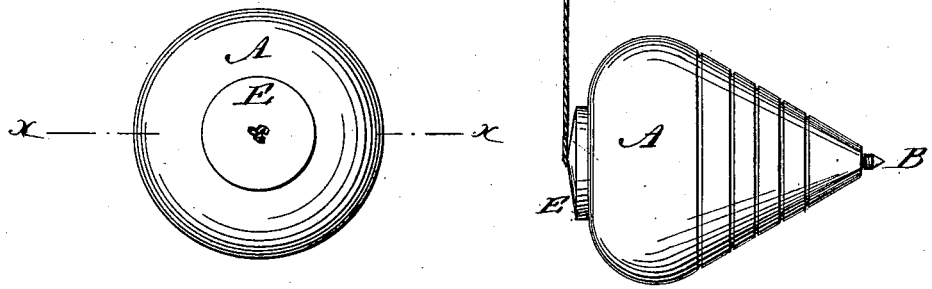
WITNESSES:
C. Neveux
C. Sedgwick
INVENTOR:
J. R. Barry
BY Munn & Co
ATTORNEYS.

UNITED STATES PATENT OFFICE.

JAMES R. BARRY, OF YONKERS, ASSIGNOR TO HIMSELF AND WM. H. HAYES, OF NEW YORK, N. Y.

TOP.

SPECIFICATION forming part of Letters Patent No. 226,958, dated April 27, 1880.

Application filed January 20, 1880.

*To all whom it may concern:*

Be it known that I, JAMES R. BARRY, of Yonkers, Westchester county, and State of New York, have invented a new and useful Improvement in Tops, of which the following is a specification.

Figure 1 is a sectional elevation of the improvement, taken through line $x$ $x$, Fig. 2. Fig. 2 is a top view, and Fig. 3 is a side elevation.

Similar letters of reference indicate corresponding parts.

The object of this invention is to furnish tops so constructed as to contain the cord when not in use, and that may be detachably swiveled to the cord.

A represents the top, which is made with a metal point, B, in the usual way. In the top A is formed a cavity, C, leading in from its upper end, and made sufficiently large to contain the top-cord D. The cord D passes through a hole in the center of a disk, E, which is made of such a size as to serve as a plug to close the cavity C, as shown in Figs. 1, 2, and 3. The cord D also passes through a hole in the center of the disk F, which is designed to serve as a button when spinning the top. The cord passes loosely through the holes in the disks E F, and has knots upon its ends to prevent the disks E F from slipping off.

The disk F is made of such a size that it may be readily slipped into and out of the cavity C.

In using the top the cord is taken out of the cavity C, the disks E F are slipped to its opposite ends, and the disk or plug E is inserted in the cavity C. The cord D is then wound upon the top A in the usual way, and the top is thrown to set it spinning. The top may be allowed to spin while the operator holds the cord D; or the operator, by a slight jerk upon the cord D, can detach the plug E from the top A without affecting the spinning of the top; or the spinning top may be supported by the cord D, and will then take a horizontal position like a gyroscope, as shown in Fig. 3.

When not in use the two disks E F are slipped together at one end of the cord D, the cord D is folded or rolled up and placed in the cavity of the top A, the disk F is placed in the cavity above the cord, and the disk or plug E is inserted in the mouth of the cavity above the cord D and disk F, as shown in Fig. 1.

Having thus described my invention, I claim as new and desire to secure by Letters Patent—

The combination of a top having a cavity, C, with the cord D and apertured disk E, the latter being adapted to fit the cavity C, substantially as shown and described.

JAMES R. BARRY.

Witnesses:
    JAMES T. GRAHAM,
    C. SEDGWICK.